(12) United States Patent
Nisiguchi

(10) Patent No.: US 7,364,032 B2
(45) Date of Patent: Apr. 29, 2008

(54) CHIP DISCHARGE SYSTEM

(75) Inventor: Shigeru Nisiguchi, Shiga (JP)

(73) Assignee: Mayfran International, Cleveland, OH (US)

( * ) Notice: Subject to any disclaimer, the term of this patent is extended or adjusted under 35 U.S.C. 154(b) by 318 days.

(21) Appl. No.: 10/941,191

(22) Filed: Sep. 15, 2004

(65) Prior Publication Data

US 2005/0126887 A1 Jun. 16, 2005

Related U.S. Application Data

(63) Continuation of application No. PCT/US03/06789, filed on Mar. 7, 2003.

(30) Foreign Application Priority Data

Mar. 19, 2002 (JP) .............................. 2002-76694

(51) Int. Cl.
*E03C 1/04* (2006.01)

(52) U.S. Cl. ..................... 198/495; 210/298; 210/525; 409/137; 236/513; 236/523

(58) Field of Classification Search .................... 1/495; 210/298, 525; 409/137; 239/513–515, 505, 239/520, 523; 198/495

See application file for complete search history.

(56) References Cited

U.S. PATENT DOCUMENTS

| 263,634 | A | * | 8/1882 | Webster | 198/495 |
|---|---|---|---|---|---|
| 783,826 | A | * | 2/1905 | Dinkel | 239/523 |
| 1,019,630 | A | * | 3/1912 | Gilman | 239/520 |
| 2,184,954 | A | * | 12/1939 | Conn | 62/64 |
| 3,591,091 | A | * | 7/1971 | Galloway et al. | 239/523 |
| 3,979,068 | A | * | 9/1976 | Applebaum | 239/284.1 |
| 4,066,472 | A | * | 1/1978 | Perry | 134/34 |
| 4,219,161 | A | * | 8/1980 | Freissle | 239/523 |
| 4,544,060 | A |   | 10/1985 | Enomoto | |
| 4,697,292 | A | * | 10/1987 | LaValley | 8/156 |
| 4,860,883 | A |   | 8/1989 | Knaul et al. | |
| 4,897,202 | A |   | 1/1990 | King | |
| 4,912,782 | A | * | 4/1990 | Robbins | 4/678 |
| 5,253,811 | A | * | 10/1993 | Sieth | 239/523 |
| 5,355,992 | A | * | 10/1994 | Baig et al. | 198/495 |
| 6,357,576 | B1 |   | 3/2002 | Enomoto | |
| 6,364,959 | B1 | * | 4/2002 | Straub et al. | 134/9 |

FOREIGN PATENT DOCUMENTS

JP            200202215       7/2000

* cited by examiner

*Primary Examiner*—Mark A. Deuble
(74) *Attorney, Agent, or Firm*—Fay Sharpe LLP; Brian E. Turung

(57) ABSTRACT

A chip discharge system with a fluid dispersing means which inhibits clogging, which has a simple structure, which can spray out a uniformly-spreading flow, and which can adjust the momentum of dispersing flow without requiring an additional device.

47 Claims, 9 Drawing Sheets (a)

(b)

CHIP DISCHARGE SYSTEM

This patent application is a continuation of co-pending PCT patent application Serial. No. PCT/US/03/06789 filed Mar. 7, 2003, which in turn claims priority on Japanese patent application Serial No. 2002-76694 filed Mar. 19, 2002.

The present invention relates to a chip discharge system, and more particularly to a chip discharge system designed to at least partially remove chips of metal from a fluid. The invention is particularly directed to a chip discharge system to at least partially remove chips of metal from a dirty coolant, and will be particularly described with reference thereto; however, it will be appreciated that the invention has broader applications.

BACKGROUND OF THE INVENTION

During a metal working or a resin finishing process such as when cutting or grinding is performed by a machine tool, the machine tool discharges coolant and chips of metal or resin of assorted sizes. Common metal that are cut and/or machined include aluminum, brass, copper, iron, magnesium, manganese, stainless steel, etc. When the machine tool cuts or grinds metal or resin material, a coolant such as cutting oil or lubricant dissolved in water is typically used to cool the cutting or grinding instrument of the machine tool, and/or to cool the workpiece. The coolant is also used to extend the life of the cutting or grinding instrument of the machine tool. The dirty coolant that contains the metal or resin chips is discharged from the machine tool to be later treated by a chip discharge system, whereby only the chips contained in the dirty coolant are separated from the coolant and collected.

The removal of metal chips from used or dirty coolant is well known in the art. Conventionally, a chip discharge conveyor system is used to separate chips from the coolant. The chip discharge conveyor system typically includes a hinged belt conveyor designed to remove only chips from the dirty coolant discharged from the machine tool and to then discharge such chips out from a treatment tank while clean coolant filtered by a filtration drum is discharged in into another tank or receptacle. On such chip discharge conveyor system is disclosed in Japanese Unexamined Patent Application 2000-202215 published Jul. 25, 2000 entitled "Turning Carrier System Filter Device", which is incorporated herein by reference.

One such prior art arrangement is illustrated in FIG. 8. FIG. 8 discloses a conventional chip discharge system, comprising a dirty coolant treatment tank 2 wherein dirty coolant D containing chips that are discharged from a machine tool M is charged, and an endless hinged belt 4 provided in the dirty coolant treatment tank 2 wherein the hinged belt circulates. The dirty coolant tank 2 comprises a series of adjacent metal plates 2a, 2b, 2c, 2d and 2e, which are in close proximity to and separated from the endless hinged belt 4.

When the dirty coolant D containing chips K is charged into the dirty coolant treatment tank 2, the hinged belt 4 scoops up chips from the dirty coolant treatment tank 2 and transports the scooped chips along a partition plate 6 to a chip discharge portion B to discharge the chips at a downturn belt section located at the top of the hinged belt 4, wherein the discharged chips are discharged into a chip collection box F or the like. The downturn belt section located at the top of the hinged belt 4 accommodates both a driving sprocket 4d to transmit power to the hinged belt 4 and a drive motor. A cylindrical member 5 is provided at a tail end portion A of hinged belt 4, whereby the hinged belt 4 makes an upward turn from the bottom and serves as a return of belt 4b to the top where the hinged belt serves as a transport to belt 4a.

The dirty coolant tank has a filtration drum 8 provided with a filtration medium 8a which filters coolant retained in the dirty coolant tank to discharge the filter coolant from the tank 2. Filtered coolant C is discharged through a coolant discharge opening 8b into a clean coolant tank E, which is located outside of the dirty coolant treatment tank. The filtered coolant is collected for reuse and/or disposal. Chips which do not pass through the filtration drum 8 and remain in tank 2 are scooped up by the hinged belt 4 and discharged from the chip discharge portion B. Since the filtration medium 8a comprising the filtration drum 8 progressively clogs, a fluid dispersing means 9 is used to clean the filtration medium. The fluid dispersing means is designed to spray cleaning fluid onto filtration drum 8 to cause chips adhering to a surface of the filtration medium 8a to be blown off the filtration drum. FIG. 9 shows a structure of the fluid dispersing means 9 used in a conventional chip discharge system. As illustrated in FIG. 9, cleaning fluid supplied from a supply pipe 9a to a fluid discharge pipe 9b (which is called a spray bar) is blown out as dispersing flow S in a fan-like shape from a plurality of fluid dispersing holes 9c, each of which is provided with a nozzle to disperse and spray cleaning fluid in a fan shaped pattern.

The fluid dispersing means used in such a conventional chip discharge system typically uses filter coolant discharged from clean coolant storage tank E. The filtered coolant typically includes fine chips. These fine chips tend to gradually accumulate in the fan-shaped nozzles of fluid dispersing holes 9c and inside fluid discharge pipe 9b. This accumulation of the fine chips eventually impairs the flow of clean coolant from pipe 9b and through holes or nozzles 9c, thus impairing or preventing the function as a fluid dispersing means from being performed, i.e. cleaning chips from filtration drum 8.

The fan-shaped nozzles need to be finely fabricated to accomplish uniformly-spreading fan-shaped flow of the coolant to be sprayed out from the fluid dispersing means; however, these finely fabricated nozzles increased production costs of the fluid dispensing means and the chip discharge system. Moreover, for the purpose of adjusting the rate or momentum of dispersing flow, a device such as a valve and/or an orifice which is used to adjust the flow characteristics of the coolant through the fluid dispersing mean such as pressure and/or volume to be supplied from the fluid discharge pipe is needs to be additionally provided, which devices also results in an increase in the number of parts of the system and increased costs.

In view of the present state of chip discharge systems, there is a need for a chip discharge system that includes less parts, that is less expensive to assemble and maintain, and which improves the efficiency of chip removal from dirty coolant.

SUMMARY OF THE INVENTION

The present invention relates to a chip discharge system, and more particularly to a chip discharge system designed to at least partially remove chips of metal from a fluid. The invention is particularly directed to a chip discharge system to at least partially remove chips of metal from a dirty coolant, and will be particularly described with reference thereto; however, it will be appreciated that the invention has broader applications. When processing, forming, and/or cutting metals such as, but not limited to, aluminum, brass, copper, iron, magnesium, manganese, stainless steel, etc., and/or resin material, a coolant such as a cutting oil and/or lubricating oil is used to facilitate in the processing, forming, and/or cutting metals, and/or to extend the life of the machinery used to process, form, and/or cut metals. During the processing, forming, and/or cutting metals, metal chips are mixed with coolant resulting a dirty coolant. The dirty coolant is then charged into a dirty coolant treatment tank and the chips are separated from the coolant and scooped up to transport such chips out from the treatment tank. The present invention is an improvement over prior art chip discharge systems. The present invention is designed to overcome the foregoing drawbacks of prior art chip discharge systems. The present invention is directed to a chip discharge system that includes less parts, that is less expensive to assemble and maintain, and which improves the efficiency of chip removal from dirty coolant.

In one aspect of the invention, there is provided a chip discharge system to separately discharge chips contained in dirty coolant discharged from a machine tool, wherein the chip discharge system has a fluid dispersing means to remove chips remaining in the system, and the fluid dispersing means comprises a fluid discharge pipe with at least one fluid dispersing hole, and a deflector plate to at least partially deflect and/or disperse flow from one or more the fluid dispersing hole or holes. One or more of the deflector plates are typically secured to the fluid discharge pipe; however, this is not required. The one or more of the deflector plates can be designed to deflect the fluid flow at a uniform or at different angles from the dispersing holes.

In another and/or alternative aspect of the invention, there is provided a chip discharge system that includes a fluid dispersing means which has a fluid dispersing hole or a plurality of fluid dispersing holes on a lateral face of the fluid discharge pipe, and purging means to at least partially discharge fluid which is not sprayed out from the one or more fluid dispersing holes. The purging means typically includes one or more openings in the fluid discharge pipe. In one embodiment, the purge means is located at an end of the fluid discharge pipe. In another and/or alternative embodiment of the invention, the purge means includes a purge opening that is larger than at least one of the fluid dispersing holes. In one aspect of this embodiment, the purge opening is larger than each of the fluid dispersing holes.

In still another and/or alternative aspect of the invention, there is provided a chip discharge system that includes a fluid dispersing means having a deflector plate wherein an angle and/or a location of the deflector plate can be changed in relation to a location of the fluid dispersing hole and a direction of fluid sprayed out from the fluid dispersing hole, whereby deflection and dispersion of flow sprayed out from the fluid dispersing hole can be adjusted.

In yet another and/or alternative aspect of the invention, there is provided a chip discharge system which has no particular restriction for the location or the like for the fluid dispersing means to be provided, as long as the fluid dispersing means is provided as a fluid dispersing means to remove chips retained in the chip discharge system, such as a fluid dispersing means provided in the chip discharge system to prevent a filtration medium from clogging, or a fluid dispersing means to be provided to prevent chips from adhering and precipitating onto a dirty coolant discharge path.

In still yet another and/or alternative aspect of the invention, there is provided a chip discharge system that includes a fluid dispersing means that resists clogging. The fluid dispersing means includes one or more fluid dispersing holes on a lateral face of a fluid discharge pipe, and a deflector plate is provided to deflect and disperse flow sprayed from the fluid dispersing hole. Such action by the deflector plate results in reduced clogging in the fluid dispersing means, thus the chip discharge system can be operated for a long period without special maintenance being required.

In a further and/or alternative aspect of the invention, there is provided a chip discharge system that includes a fluid dispersing means having a purging means at an end of the fluid discharge pipe, whereby fluid which is not sprayed out from the fluid dispersing hole is rapidly drained, thus clogging at the fluid dispersing means is inhibited or eliminated thereby enabling the chip discharge system to be operated for a longer period without special maintenance being required.

In still a further and/or alternative aspect of the invention, there is provided a chip discharge system that includes a fluid dispersing means having a deflector plate wherein an angle and or a location of the deflector plate can be changed in relation to a location of the fluid dispersing hole and a direction of fluid sprayed out from the fluid dispersing hole, whereby deflection and dispersion of flow sprayed out from the fluid dispersing hole can be changed.

It is accordingly a general object of the present invention to overcome the foregoing drawbacks of the prior art.

Another and/or alternative object of the present invention is to provide a chip discharge system whereby problems arising in the conventional chip discharge system mentioned above are solved, and wherein a fluid dispersing means is provided that reduces clogging, has a simple structure, can spray out a uniformly-spreading flow, and can adjust the momentum of dispersing flow without requiring an additional device.

Still another and/or alternative object of the present invention is to provide a chip discharge system whereby the chip discharge system has a fluid dispersing means includes a deflector plate to deflect and disperse flow from the fluid dispersing hole or holes.

Yet another and/or alternative object of the present invention is to provide a chip discharge system whereby a fluid dispersing means has a fluid dispersing hole or a plurality of fluid dispersing holes on a lateral face of the fluid discharge pipe.

Still yet another and/or alternative object of the present invention is to provide a chip discharge system whereby a fluid dispersing means includes a purging means to discharge fluid which is not sprayed out from the fluid dispersing hole.

A further and/or alternative object of the present invention is to provide a chip discharge system that includes a fluid dispersing means wherein the direction of fluid sprayed out from the fluid dispersing means can be adjusted.

Still a further and/or alternative object of the present invention is to provide a chip discharge system that includes a fluid dispersing means having a deflector plate wherein an angle and/or a location of the deflector plate can be changed in relation to a location of the fluid dispersing hole.

Yet a further and/or alternative object of the present invention is to provide a chip discharge system that inhibits or prevents a filtration medium from clogging.

Still yet a further and/or alternative object of the present invention is to provide a chip discharge system that inhibits or prevents chips from adhering and precipitating onto a dirty coolant discharge path.

Another and/or alternative object of the present invention is to provide a chip discharge system whereby the chip discharge system can be operated for a long period without special maintenance being required.

These and other objects and advantages will become apparent from the following description used to illustrate the preferred embodiment of the invention when read in conjunction with the accompanying drawings.

BRIEF DESCRIPTION OF THE DRAWINGS

FIGS. 2 and 2a are an enlarged perspective view of the fluid dispersing means and its cross-sectional view according to the present invention;

DESCRIPTION OF THE PREFERRED EMBODIMENTS

Figure 1:
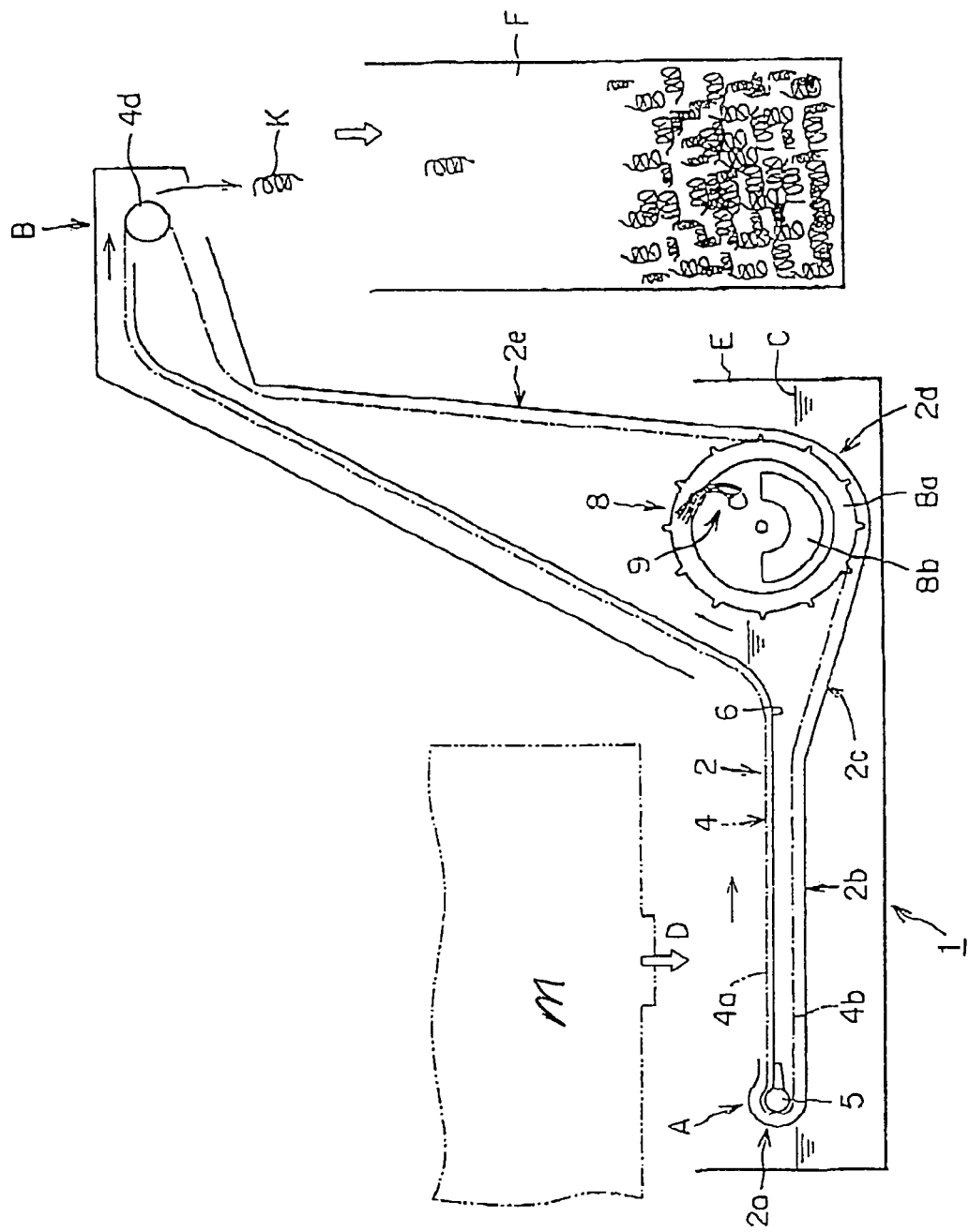
FIG. 1 is a schematic cross-sectional view of a chip discharge system according to a first embodiment of the present invention.

Referring now to the preferred embodiment of the drawings, wherein the showings are for the purpose of illustrating a preferred embodiment of the invention only and not for the purpose of limiting the invention, FIG. 1 is a cross-sectional view on one embodiment of a chip discharge system according to the present invention. The chip discharge system has a fluid dispersing means 9 whereby a filtration medium of the filter drum 8 is cleaned to inhibit or prevent the filtration medium 8a from clogging. The fluid dispersing means 9 includes a fluid discharge pipe 9b with one or more fluid dispersing holes 9c provided on a lateral face of the discharge pipe. The fluid dispersing means also includes a deflector plate 9e to deflect the flow of the coolant sprayed from the one or more fluid dispersing hole.

Figure 8:
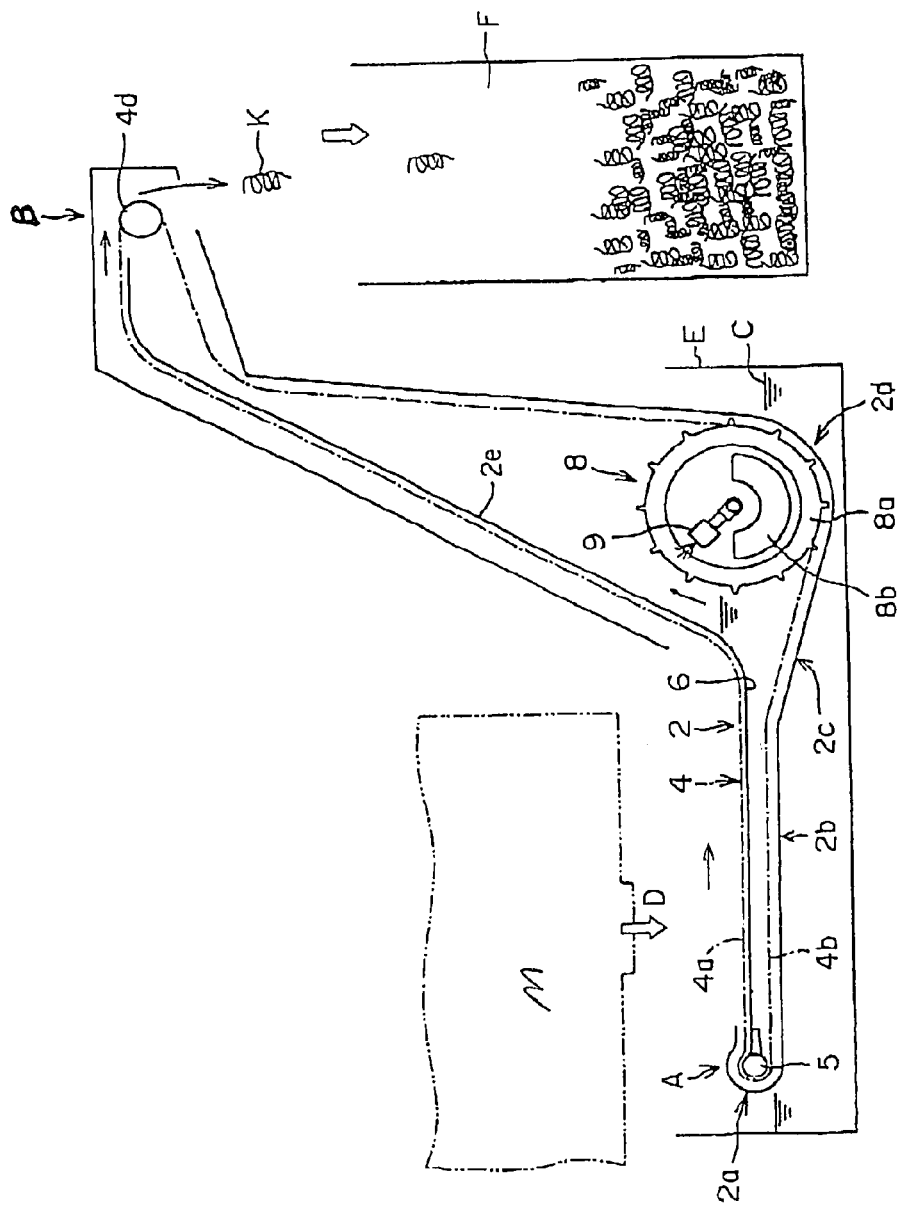
FIG. 8 is a cross-sectional view of a conventional prior art chip discharge system; and, FIG. 9 is a perspective view of fluid dispersing means for a conventional prior art chip discharge system.

The structure of the chip discharge system, except the fluid dispersing means 9, is similar to that of the conventional chip discharge systems mentioned above. As such the reference symbols used to described the prior art chip discharge system illustrated in FIG. 8 are used to denote corresponding structures of the chip discharge system illustrated in FIG. 1. Chip discharge system 1 includes a dirty coolant treatment tank 2 wherein dirty or used coolant D containing chips K (e.g., metal chips, graphite chips, etc.). The dirty coolant is typically discharged fluid from a machine tool M used to cut, form and/or shape metal materials; however, the dirty coolant can be from other sources. The dirty coolant typically includes water, lubricating oil and/or cutting oil and chips of material that were cut, form and/or shape by the machine tool. The dirty coolant D from the machine tool M is directed into dirty coolant treatment tank 2 are indicated by the arrow. Positioned in dirty coolant treatment tank 2 is an endless hinged belt 4 wherein the hinged belt circulates. The dirty coolant treatment tank 2 also includes a series of adjacent metal plates 2a, 2b, 2c, 2d and 2e, which are in close proximity to and separated from the endless hinged belt 4.

When the dirty coolant D containing chips K is charged dirty coolant treatment tank 2, hinged belt 4 scoops up the chips from the dirty coolant treatment tank and transports the scooped chips along a partition plate 6 to a chip discharge portion B to discharge the chips at a downturn belt section located at the top of the hinged belt 4. At this point, the chips are discharged into a chip collection box F or the like. The downturn belt section located at the top of the hinged belt 4 typically includes both a driving sprocket 4d to transmit power to the hinged belt 4 and a drive motor to cause the hinge belt to continuously travel along metal plates 2a, 2b, 2c, 2d and 2e. A cylindrical member 5 is provided at a conveyor tail end portion A of hinged belt 4, whereby the hinged belt 4 makes an upward turn from the bottom and serves as a return of belt 4b to belt portion 4a to again travel to the chip discharge portion B.

The dirty coolant treatment tank includes a filtration drum 8 provided with a filtration medium 8a which filters coolant retained in the dirty coolant tank to thereby discharge the filter coolant from the tank 2. The filtered coolant is discharged through a coolant discharge opening 8b into a clean coolant storage tank E, which is located outside or separate from the dirty coolant treatment tank. The filtered coolant is collected for reuse and/or disposal. The chips which do not pass through the filtration drum 8 and remain in tank 2 are scooped up by the hinged belt 4 and discharged from the chip discharge portion B into chip collection box F. The filtration drum includes a fluid dispersing means 9 to inhibit or prevent the filtration medium 8a from becoming clogged. The fluid dispersing means is designed to spray clean or filtered fluid onto filtration drum 8 to cause chips adhering to a surface of the filtration medium 8a to be blown off or removed from the filtration drum. The fluid dispersing means typically filtered coolant discharged from clean coolant storage tank E; however, other and/or additional sources coolant can be used.

Figure 2:
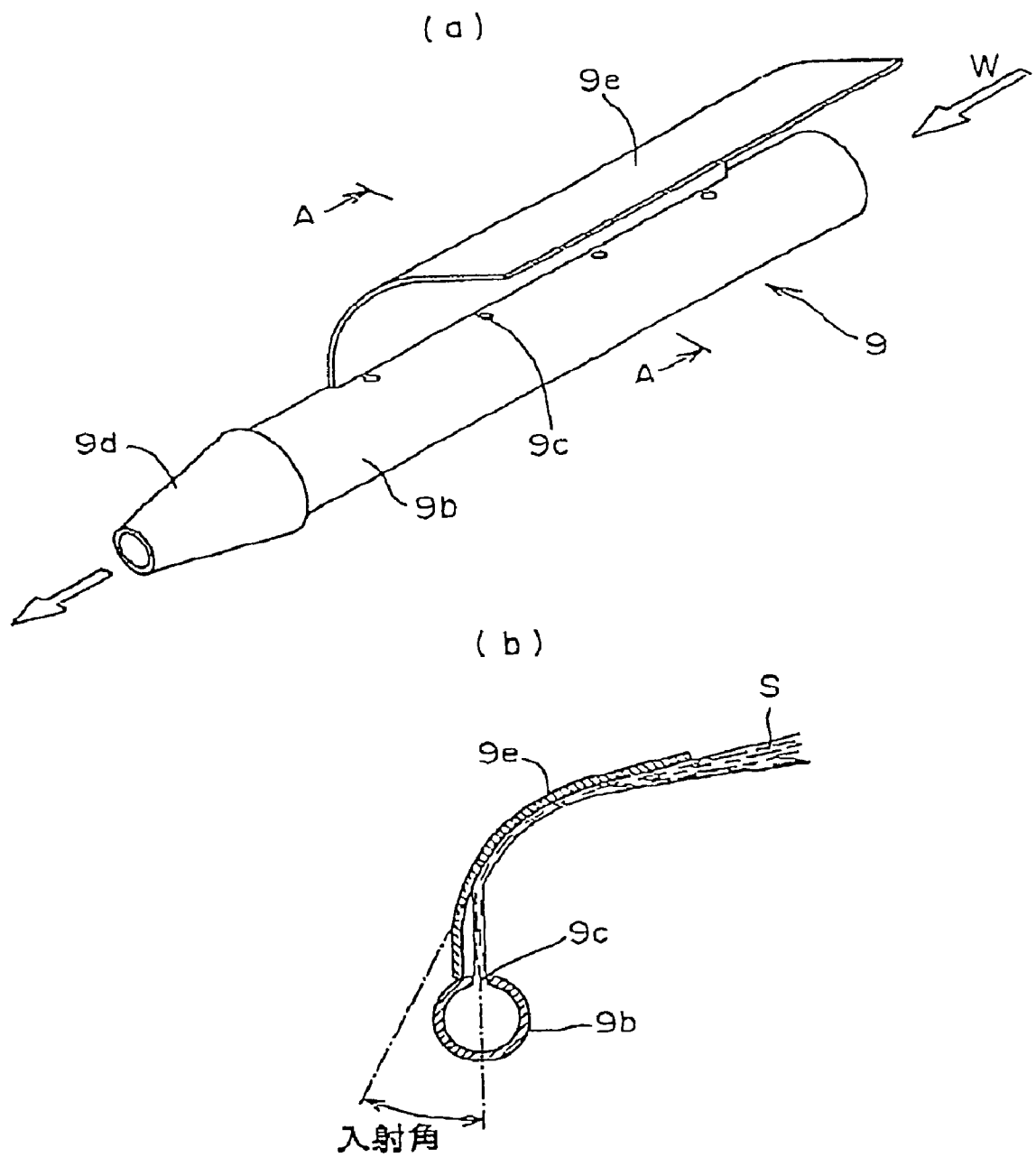
Figure 9:
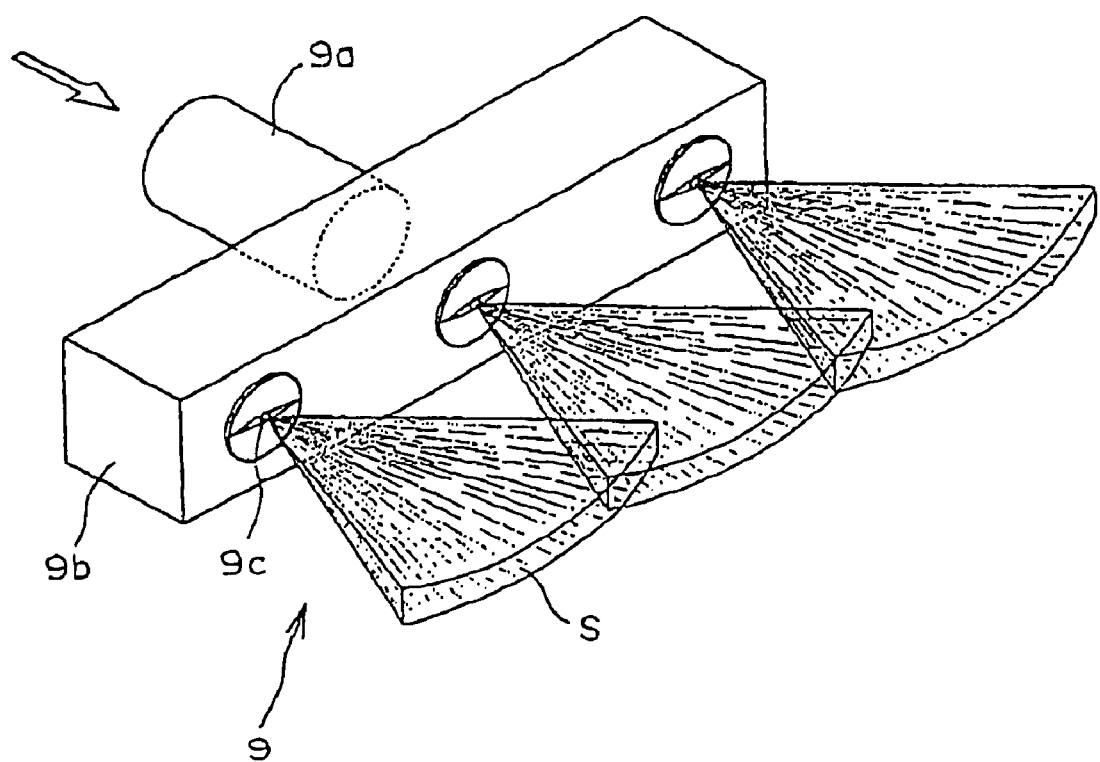

Referring now to FIG. 2, there is disclosed an improved fluid dispersing means from the fluid dispersing means disclosed in FIG. 9. As illustrated in FIG. 2, fluid dispersing means includes a fluid discharge pipe 9b denotes a fluid discharge pipe (which is called a spray bar), and cleaning fluid W is supplied to the fluid discharge pipe via a supply pipe (which is not shown). Cleaning fluid W is typically filtered coolant that has been discharged into clean coolant storage tank E; however, other or additional sources can be used. On a lateral face of the fluid discharge pipe 9b, a plurality of fluid dispersing holes 9c are provided, whereby the cleaning fluid is sprayed out. A deflector plate 9e having an arched shape and connected to the fluid discharge pipe is designed to at least partially deflect the sprayed cleaning fluid from fluid discharge pipe 9b. The cleaning fluid that is sprayed out from the fluid dispersing hole 9c subsequently deflected by deflector plate 9e disperses the spray of cleaning fluid due to the impact of the fluid on the deflector plate. As a result, a conventional fan-shaped nozzle does not need to be used for the fluid dispersing hole 9c as used in prior art arrangements. The absence of a need to use a specially designed nozzle in the fluid dispersion hole results in a simplification of the design of the fluid discharge pipe 9b. As a result, fluid dispersing holes 9c can merely be standard holes formed by simple drilling process of the like. In addition, the size of the fluid dispersing hole 9c is not specifically restricted as long as the hole is sufficiently larger than the size of solid substances contained in the cleaning fluid (e.g., metal chip fines). This design allows for a simpler and more cost effective design as compared with past design as illustrated in FIG. 2. The size of the fluid dispersing holes 9c can also be sized and configured (e.g., circular cross-sectional shape as opposed to a prior art elliptical cross sectional shape) so as to reduce the incidence of clogging of the fluid dispersing holes.

Figure 3:
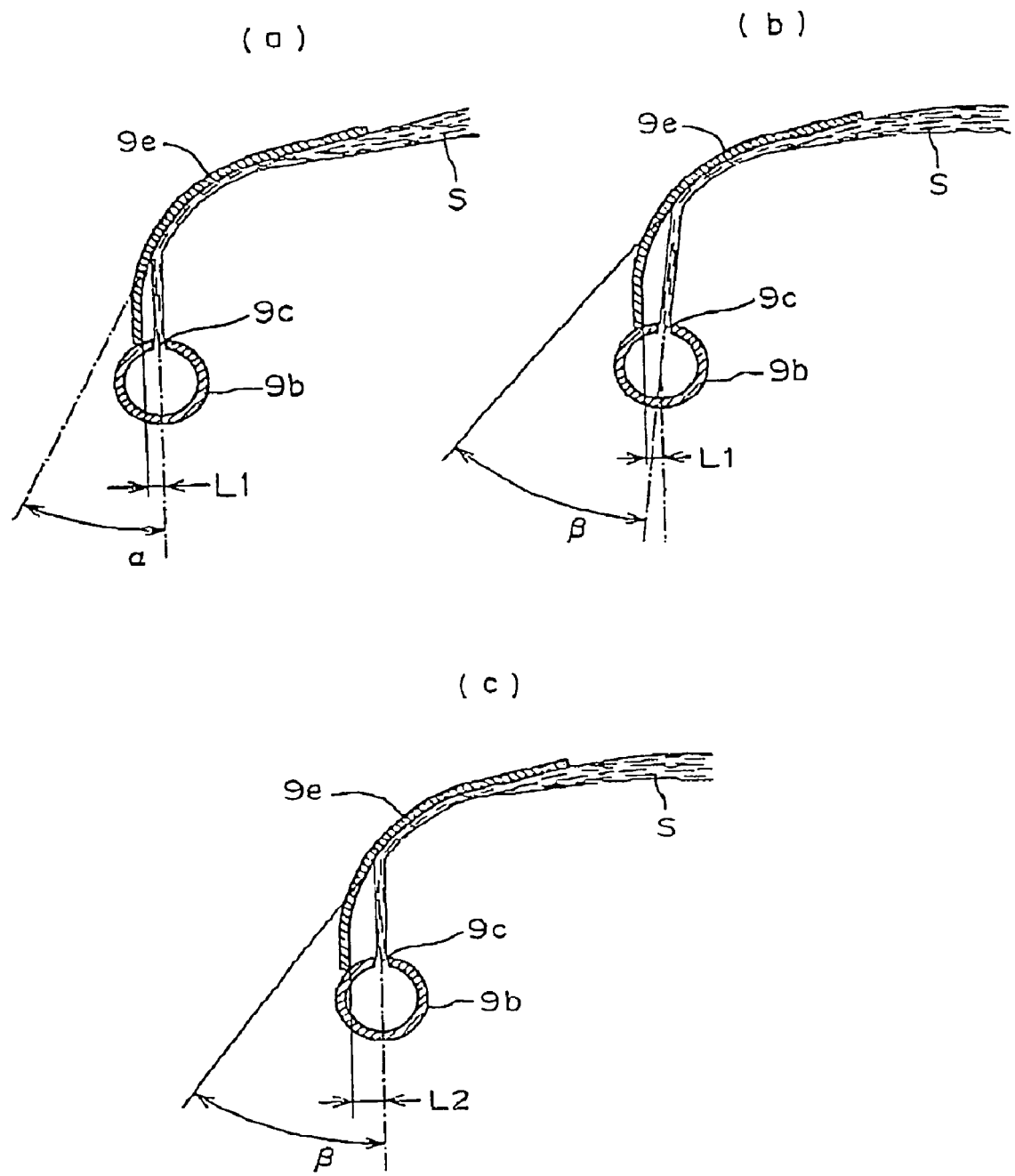
FIGS. 3a-c are enlarged cross-sectional views of the fluid dispersing means that illustrate various locations of a deflector plate for the fluid dispersing means and the condition of the dispersing flow.
Figure 4:
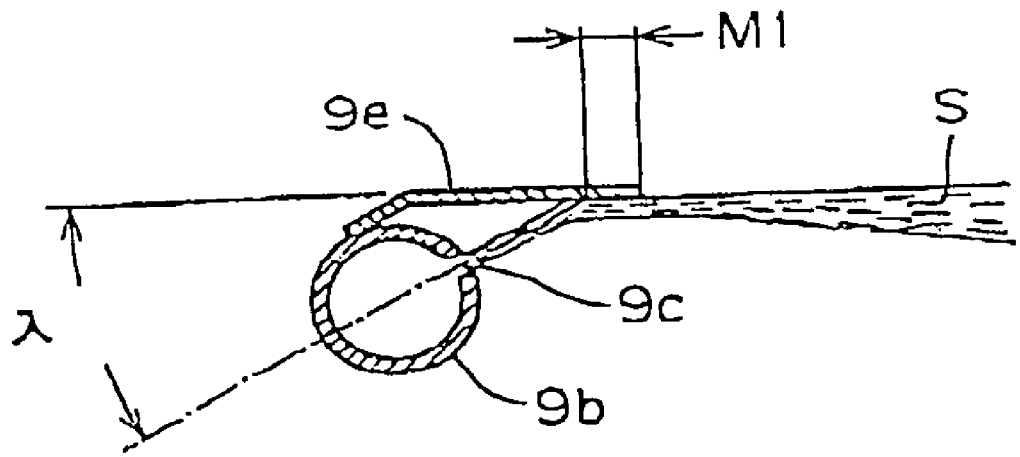
FIGS. 4a and 4b are enlarged cross-sectional views of the fluid dispersing means that illustrate the relation between the size of a deflector plate for the fluid dispersing means and the condition of dispersing flow.
Figure 4:
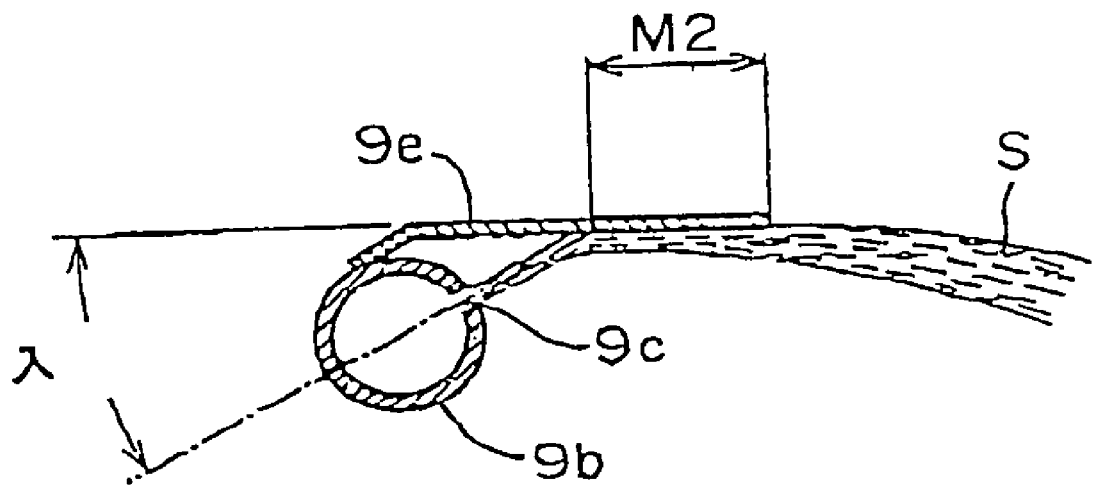

The deflection and dispersion of the cleaning fluid sprayed out from the fluid dispersing hole 9c can be changed by changing the dimensions and location of the deflector plate 9e. FIGS. 3a-c and 4a-b illustrate various dimensions of the deflector plate and the relation between the location and the deflection and dispersion of dispersing flow. As can be appreciated, many other configurations can be used. As a comparison between FIG. 3a and FIG. 3b illustrates, when the distances L1 between the deflector plate 9e and the fluid discharge opening 9c are kept substantially the same while making the incident angles greater (incident angle α<incident angle β), the momentum of deflected and dispersed flow S is reduced. It should also be noted that, as shown by comparison between FIG. 3b and FIG. 3c, when incident angles are kept identical (incident angle β) while making the distances between the deflector plate 9e and the dispersing hole 9c greater (L1<L2), momentum of deflected and dispersed flow S becomes also is reduced. As such, the velocity of the fluid from the configuration in FIG. 3a is greater than the configuration in FIG. 3b, which in turn is greater than the configuration in FIG. 3c.

In contrast, as shown in FIGS. 4a-b, when the incident angle is kept identical (incident angle γ) while making the distance from the intersection between dispersing direction and the deflector plate to the tip of the deflector plate greater (M1<M2), the momentum of deflected and dispersing flow S is reduced. Accordingly, changes in dimensions and location of the deflector plate 9e can be used to control momentum and dispersion of the dispersing flow without having to change the shape or dimensions of the fluid dispersing hole 9c.

Referring now to FIG. 2a, the fluid dispersing means 9 used in the chip discharge system includes a purging means 9d positioned at the tip of the fluid discharge pipe 9b. As can be appreciated, the purging means can be located in other or additional locations. It can further be appreciated that more than one purging means can be used on the fluid discharge pipe. The purging means is designed to drain out cleaning fluid which is not sprayed through the fluid dispensing holes. The purging means 9d includes a cone-shaped nozzle whose tip is open. As can be appreciated, other shapes for the nozzle can be used. By adjusting the bore size of the nozzle, dispersing pressure of the cleaning fluid sprayed out from the fluid dispersing holes 9c can be adjusted. As illustrated in FIG. 2a, purging means 9d is directly connected to the fluid discharge pipe 9b; however, the purging means can be provided separately from the fluid dispersing means 9 via piping, a hose, etc. It should also be noted that an orifice and/or a valve can be used for the purging means as an alternative or in additional to the nozzle described above. When a valve is used, the valve can be manually operated, semi-manually operated, or automatically operated (e.g., automatically open at certain time periods, automatically open when a certain pressure level occurs, etc.).

Figure 5:
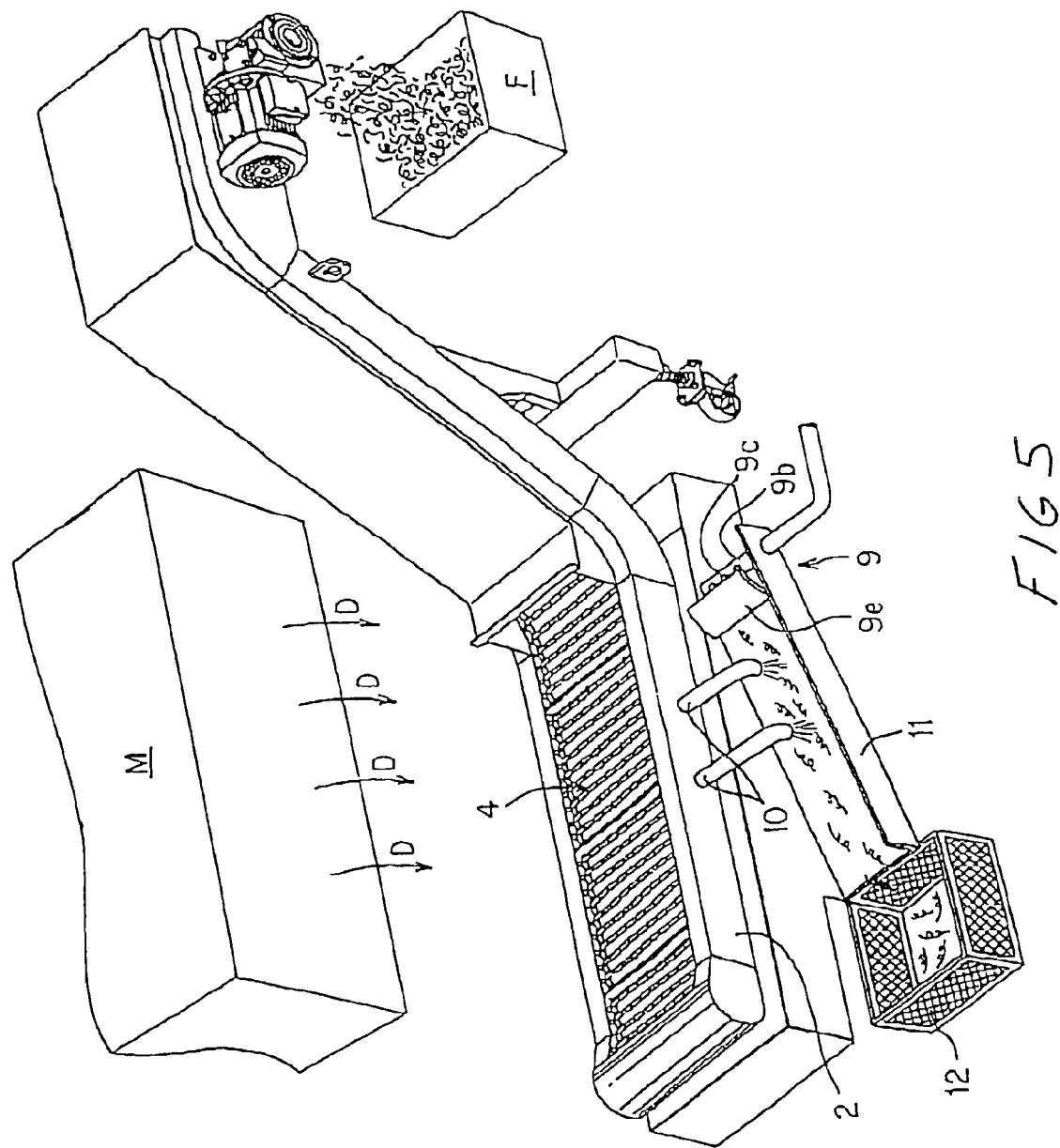
FIG. 5 is a perspective view of a discharge system of a second embodiment according to the present invention.

Referring now to FIG. 5, another embodiment of the invention is illustrated. FIG. 5 is a perspective view of a chip discharge system 1 that includes a dirty coolant treatment tank 2 having a drain hole 10 provided on a side wall thereof to discharge dirty coolant D from the tank. The discharged dirty coolant passes through a inclined slope 11 and is collected at a separating screen box 12. The separating screen box is designed to collect the larger sized chips that pass through the drain holes. The fluid dispersing means 9 is provided to remove chips adhering to and remaining on the slope 11. A deflector plate 9e is positioned on return 11 and is designed to direct fluid onto the slope 11 which is being discharged from fluid discharge pipe 9b and sprayed through fluid dispensing holes 9c. The deflector plate downwardly deflects the sprayed coolant onto slope 11. The structure and function of the fluid dispersing means is similar to the fluid dispersing means disclosed in FIGS. 1-4, thus will not be further described.

Figure 6:
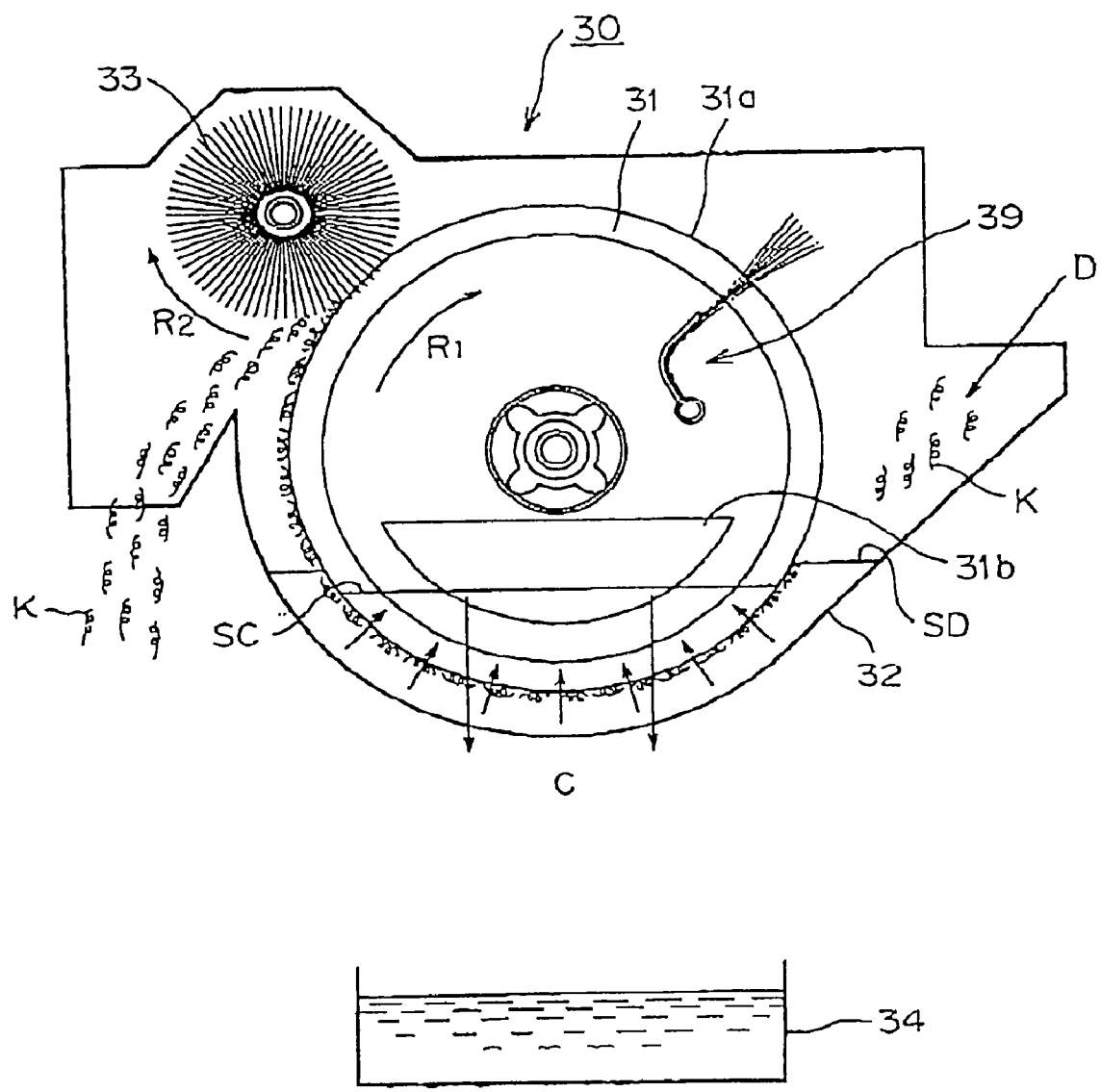
FIG. 6 is a cross-sectional view of a discharge system of a third embodiment according to the present invention.

Referring now to FIG. 6, a third embodiment of the present invention is disclosed. FIG. 6 is a cross-sectional view of a chip discharge system 30 comprising a dirty coolant treatment tank 32. Positioned in the dirty coolant treatment tank is a rotating filtration drum 31 that receives dirty coolant D which is discharged from a machine tool or the like. The dirty coolant is filtered by a filtration medium 31a on filtration drum 31, and filtered coolant C is discharged through a coolant discharge opening 31b provided on a side wall of filtration drum 31. The filtered coolant is collected in an external clean coolant tank 34 for recycling, reuse and/or disposal. Chips K that are contained in dirty coolant D are trapped by on a surface of the filtration medium 31a of filtration drum 31 and scooped up by the filtration drum. The chips are subsequently scraped off the filtration drum by a rotating brush 33 which contacts or is positioned closely adjacent to the surface of the filtration drum 31. The rotating brush causes the chips on the filtration drum to be discharged from the dirty coolant tank 32. Arrows described as R1 and R2 in FIG. 6 denote rotation directions of the filtration drum 31 and the rotating brush 33, respectively. SD and SC denote the fluid levels of dirty coolant in the dirty coolant treatment tank 32 and of filtered coolant in the filtration drum 31, respectively. A fluid dispersing means 39 is provided inside filtration drum 31 to remove fine chips intruded into the inside of the filtration medium 31a and/or chips caught by a surface of the filtration medium 31a by dispersing fluid so as to inhibit or prevent the filtration medium 31a (e.g., screen, wire mesh, fabric mesh, metal and/or fabric filter material, etc.) from clogging. The structure and function of the fluid dispersing means 39 are similar to the fluid dispersing means described in FIGS. 1-4, thus will not be further described.

Figure 7:
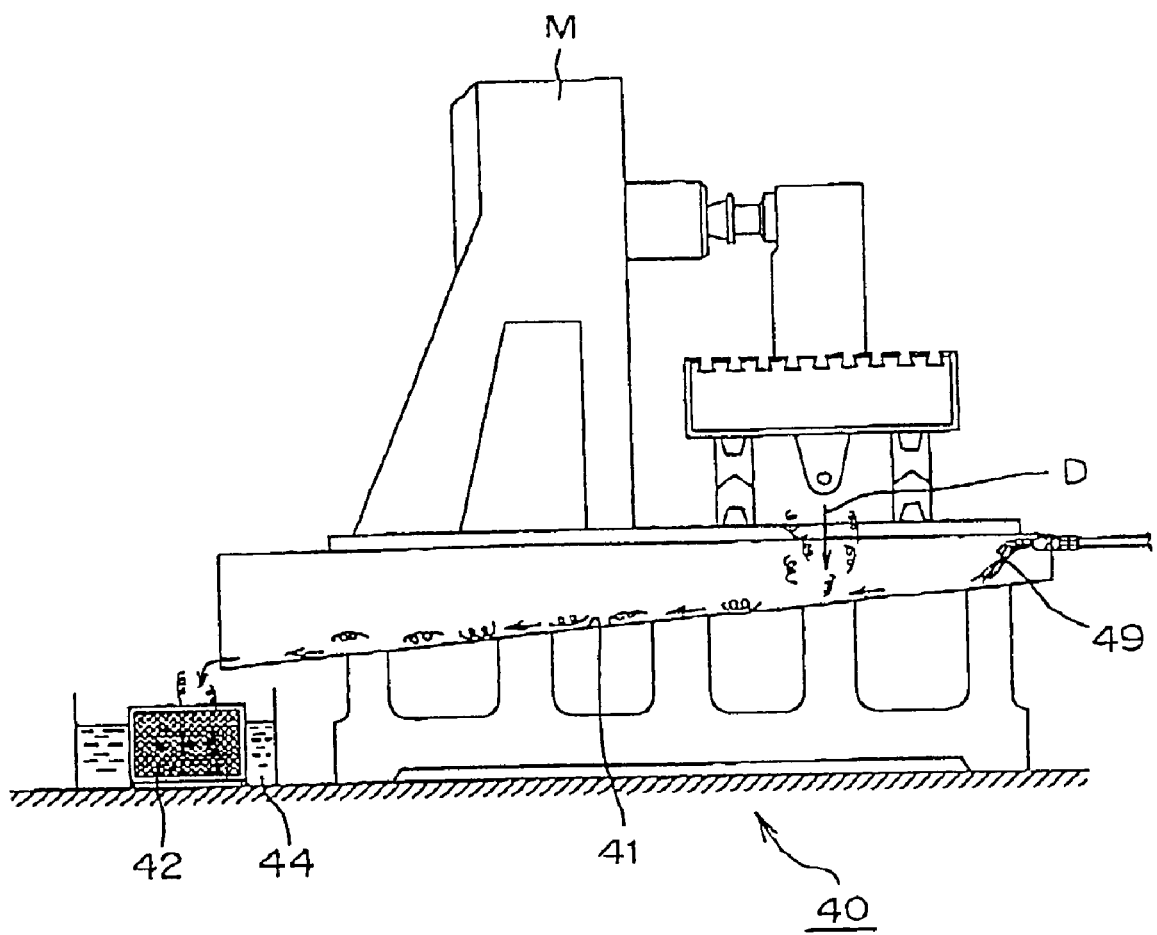
FIG. 7 is a side view of a discharge system of a fourth embodiment according to the present invention.

Referring now to FIG. 7, a fourth embodiment of the present invention is disclosed. FIG. 7 illustrates a side view of a chip discharge system 40. The dirty coolant D containing chips is discharged from a machine tool M onto an inclined slope 41. The discharged dirty coolant is collected in a separating screen box 42, wherein the chips in dirty coolant D are caught and the filtered coolant is collected in a coolant tank 44 for recycling, reuse and/or disposal. A fluid dispersing means 49 is provided at upstream of the slope 41 to remove chips adhering to and retained on the surface of the slope. The structure and function of the fluid dispersing means is similar to the fluid dispersing means described with respect to FIG. 1-4.

In the present invention, the fluid dispersing means can be provided to inhibit or prevent a drum-like filtration medium provided in the dirty coolant tank as explained in the first and third embodiments from becoming clogged, and it can also be used to inhibit or prevent chips from adhering to a dirty coolant discharge path as shown in the second and fourth embodiments. In addition, the fluid dispersing means can be provided at a variety of locations on a chip discharge system wherein chips remain.

Because the present invention has the system structure mentioned above, the following operation peculiar to the present invention is achieved.

First, the invention comprises a fluid dispersing means whereby a fluid dispersing hole is provided on a lateral face of a fluid discharge pipe, and a deflector plate is provided to deflect and disperse flow sprayed from the fluid dispersing hole, clogging in the fluid dispersing means is restrained from developing and, furthermore, the chip discharge system can be operated for a long period without special maintenance being required. It should also be noted that deflection and dispersion of the flow can be adjusted only by changing a location of the deflector plate, whereby chips can be efficiently removed.

It should also be noted that in the invention, in addition to operation achieved by the invention described above, a purging means is provided at an end of the fluid discharge pipe, whereby fluid which is not sprayed out from the fluid dispersing hole is rapidly drained and clogging at the fluid dispersing means is better eliminated. Additionally, maintenance activities to be performed for the chip discharge system are further reduced.

It should also be noted that the invention, in addition to the operation achieved by the invention described above, comprises a deflector plate wherein an angle and/or a location of the deflector plate can be changed in relation to a location of the fluid dispersing hole and a direction of fluid sprayed out from the fluid dispersing hole, whereby deflection and dispersion of flow sprayed out from the fluid dispersing hole can be easily adjusted. Moreover, an adjustment device such as a valve or the like are not additionally required, which consequently decreases in the number of parts of the chip discharge system.

DESCRIPTION OF THE REFERENCE SYMBOLS 1, 30, 40 chip discharge system
2, 32 dirty coolant treatment tank
2a, 2b, 2c, 2d and 2e metal plates
4 hinged belt
4a top transport hinged belt
4b bottom return hinged belt
4d driving sprocket
5 cylindrical member
6 partition plate
8, 31 filtration drum
8a, 31a filtration medium
8b, 31b coolant discharge opening
9, 39, 49 means for dispersing fluid
9a supply pipe
9b fluid discharge pipe
9c fluid dispersing hole
9d purging means
9e deflector plate
10 drain hole
11, 41 slope
12, 42 separating screen box
33 rotating brush
34, 44 coolant tank A conveyor tail portion
B chip discharge portion
C coolant
D dirty coolant
E clean coolant storage tank
F chip collection box
M machine tool
S dispersing flow
W cleaning fluid The invention has been described with reference to preferred and alternate embodiments. Modifications and alterations will become apparent to those skilled in the art upon reading and understanding the detailed discussion of the invention provided for herein. This invention is intended to include all such modifications and alterations insofar as they come within the scope of the present invention.

I claim:

1. A chip discharge system to separate metal chips contained in coolant discharged from a machine tool comprising a fluid dispersing arrangement that at least partially removes said chips retained in said system, said fluid dispersing arrangement having a fluid discharge pipe with at least one fluid dispersing hole, and a deflector plate to at least partially deflect and disperse fluid flowing out from the fluid dispersing hole, said fluid discharge pipe including a purging arrangement, said purging arrangement including at least one purge opening to discharge a portion of said coolant from said fluid discharge pipe, said at least one purge opening having a cross-sectional area that is greater than a cross-sectional area of each of said fluid dispersing holes, that includes a fluid entry opening designed to enable fluid to enter a passageway in said fluid discharge pipe, a purge opening designed to enable the discharge of a portion of said fluid from said passageway of said fluid discharge pipe, a plurality of fluid dispersing holes in communication with said passageway to enable fluid flow out of at least one side of said fluid discharge pipe, and a deflector plate to at least partially deflect and disperse fluid flowing out from the fluid dispersing holes to form a fluid spray pattern onto at least a portion of said filter arrangement, said deflector plate connected to said fluid discharge pipe, said fluid dispersing holes located on a lateral face of said fluid discharge pipe, said purge opening having a cross-sectional area that is greater than a cross-sectional area of each of said fluid dispersing holes, said purge opening having a cross-sectional area that is less than a cross-sectional area of said fluid entry opening.

2. The chip discharge system as defined in claim 1, wherein at least one of said fluid dispersing holes is located on a lateral face of said fluid discharge pipe.

3. The chip discharge system as defined in claim 2, wherein a plurality of said fluid dispersing holes are located on a lateral face of said fluid discharge pipe.

4. The chip discharge system as defined in claim 1, wherein at least one of said purge openings is located at an end of the fluid discharge pipe.

5. The chip discharge system as defined in claim 1, wherein at least one of said fluid dispersing holes has a substantially circular cross-sectional shape.

6. The chip discharge system as defined in claim 5, wherein a plurality of said fluid dispersing holes have a substantially circular cross-sectional shape.

7. The chip discharge system as defined in claim 1, wherein said deflector plate is connected to said fluid discharge pipe.

8. The chip discharge system as defined in claim 1, wherein an angle of said deflector plate is changeable in relation to a location of said fluid dispersing hole and a direction of fluid sprayed out from said fluid dispersing hole so as to adjust the deflection and dispersion of flow sprayed out from said fluid dispersing hole can be adjusted.

9. The chip discharge system as defined in claim 1, wherein a location of said deflector plate is changeable in relation to a location of said fluid dispersing hole and a direction of fluid sprayed out from said fluid dispersing hole so as to adjust the deflection and dispersion of flow sprayed out from said fluid dispersing hole can be adjusted.

10. The chip discharge system as defined in claim 1, wherein a length of said deflector plate is changeable in relation to a location of said fluid dispersing hole and a direction of fluid sprayed out from said fluid dispersing hole so as to adjust the deflection and dispersion of flow sprayed out from said fluid dispersing hole can be adjusted.

11. The chip discharge system as defined in claim 1, wherein said deflector plate having an arcuate shape.

12. A chip discharge system that includes a fluid dispersing arrangement that separates metal chips contained in coolant, said fluid dispersing arrangement comprising a fluid dispersing arrangement that at least partially removes said chips retained in said system having a fluid discharge pipe that includes first and second ends and a passageway therebetween, a plurality of fluid dispersing holes in communication with said passageway to enable fluid flow out of at least one side of said fluid discharge pipe, and a deflector plate to at least partially deflect and disperse fluid flowing out from said at least one fluid dispersing hole, said first end of said fluid discharge pipe designed to enable coolant to enter said passageway of said fluid discharge pipe, said second end of said fluid discharge pipe is designed to be a purging arrangement to enable the discharge of a portion of said coolant from said fluid discharge pipe, said second end having an opening that has a cross-sectional area that is greater than a cross-sectional area of each of said fluid dispersing holes, said deflector plate connected to said fluid discharge pipe, said opening in said second end having a cross-sectional area that is less than a cross-sectional area of an opening in said first end.

13. The chip discharge system as defined in claim 12, wherein at least one of said fluid dispersing holes is located on a lateral face of said fluid discharge pipe.

14. The chip discharge system as defined in claim 13, wherein a plurality of said fluid dispersing holes are located on a lateral face of said fluid discharge pipe.

15. The chip discharge system as defined in claim 12, wherein at least one of said purge opening is located at an end of the fluid discharge pipe.

16. The chip discharge system as defined in claim 12, wherein at least one of said fluid dispersing holes has a substantially circular cross-sectional shape.

17. The chip discharge system as defined in claim 16, wherein a plurality of said fluid dispersing holes have a substantially circular cross-sectional shape.

18. The chip discharge system as defined in claim 12, wherein an angle of said deflector plate is changeable in relation to a location of said fluid dispersing hole and a direction of fluid sprayed out from said fluid dispersing hole so as to adjust the deflection and dispersion of flow sprayed out from said fluid dispersing hole can be adjusted.

19. The chip discharge system as defined in claim 12, wherein a location of said deflector plate is changeable in relation to a location of said fluid dispersing hole and a direction of fluid sprayed out from said fluid dispersing hole so as to adjust the deflection and dispersion of flow sprayed out from said fluid dispersing hole can be adjusted.

20. The chip discharge system as defined in claim 12, wherein a length of said deflector plate is changeable in relation to a location of said fluid dispersing hole and a direction of fluid sprayed out from said fluid dispersing hole so as to adjust the deflection and dispersion of flow sprayed out from said fluid dispersing hole can be adjusted.

21. The chip discharge system as defined in claim 12, wherein said deflector plate has an arcuate shape.

22. A chip discharge system to separate metal chips contained in coolant discharged from a machine tool comprising coolant treatment tank that receives said coolant discharged from said machine tool, a filter arrangement that at least partially separates said chips from said coolant, and a fluid dispersing arrangement that at least partially removes said chips retained in at least a portion of said filter arrangement, said fluid dispersing arrangement having a fluid discharge pipe that includes a fluid entry opening designed to enable fluid to enter a passageway in said fluid discharge pipe, a purge opening designed to enable the discharge of a portion of said fluid from said passageway of said fluid discharge pipe, a plurality of fluid dispersing holes in communication with said passageway to enable fluid flow out of at least one side of said fluid discharge pipe, and a deflector plate to at least partially deflect and disperse fluid flowing out from the fluid dispersing holes to form a fluid spray pattern onto at least a portion of said filter arrangement, said deflector plate connected to said fluid discharge pipe, said fluid dispersing holes located on a lateral face of said fluid discharge pipe, said pure opening having a cross-sectional area that is greater than a cross-sectional area of each of said fluid dispersing holes, said purge having a cross-sectional area that is less than a cross-sectional area of said fluid entry opening.

23. The chip discharge system as defined in claim 22, wherein said filter arrangement includes a filtration drum, said filtration drum at least partially preventing chips in said fluid from entering an interior chamber of said filtration drum as said fluid flows into said filtration drum.

24. The chip discharge system as defined in claim 23, wherein an outer surface of said filtration drum at least partially includes a filtration medium.

25. The chip discharge system as defined in claim 23, wherein said fluid dispersing arrangement directs fluid on an exterior surface of said filtration drum to at least partially remove chips on said exterior surface of said filtration drum.

26. The chip discharge system as defined in claim 23, wherein said fluid dispersing arrangement directs fluid on an interior region of said filtration drum to at least partially remove chips on an exterior region of said filtration drum.

27. The chip discharge system as defined in claim 22, wherein said filter arrangement includes a feed channel and a separating container, said feed channel directing fluid from said coolant treatment tank into said separating container, said separating container including a filtration medium that at least partially prevents chips in said fluid from exiting an interior region of said separating container.

28. The chip discharge system as defined in claim 22, wherein said fluid discharge pipe includes purging arrangement, said purging arrangement including at least one purge opening to discharge a portion of said coolant from said fluid discharge pipe, said at least one purge opening having a cross-sectional area that is greater than a cross-sectional area of at least one of said fluid dispersing holes.

29. The chip discharge system as defined in claim 28, wherein said at least one purge opening has a cross-sectional area that is greater than a cross-sectional area of each of said fluid dispersing holes.

30. The chip discharge system as defined in claim 28, wherein at least one of said purge openings is located at an end of the fluid discharge pipe.

31. The chip discharge system as defined in claim 22, wherein at least one of said fluid dispersing holes has a substantially circular cross-sectional shape.

32. The chip discharge system as defined in claim 29, including a cone-shaped nozzle on an end of said at least one purge opening.

33. The chip discharge system as defined in claim 22, wherein an angle of said deflector plate is changeable in relation to a location of said fluid dispersing hole and a direction of fluid sprayed out from said fluid dispersing hole so as to adjust the deflection and dispersion of flow sprayed out from said fluid dispersing hole can be adjusted.

34. The chip discharge system as defined in claim 22, wherein a location of said deflector plate is changeable in relation to a location of said fluid dispersing hole and a direction of fluid sprayed out from said fluid dispersing hole so as to adjust the deflection and dispersion of flow sprayed out from said fluid dispersing hole can be adjusted.

35. The chip discharge system as defined in claim 22, wherein a length of said deflector plate is changeable in relation to a location of said fluid dispersing hole and a direction of fluid sprayed out from said fluid dispersing hole so as to adjust the deflection and dispersion of flow sprayed out from said fluid dispersing hole can be adjusted.

36. The chip discharge system as defined in claim 22, wherein said deflector plate having an arcuate shape.

37. A method of separating metal chips that are contained in coolant discharged from a machine tool comprising:
   a) providing a coolant treatment tank to receive said coolant discharged from said machine tool,
   b) providing a filter arrangement that at least partially separates said chips from said coolant, and,
   c) providing a fluid dispersing arrangement that at least partially removes said chips that are retained in at least a portion of said filter arrangement, said fluid dispersing arrangement including a fluid discharge pipe including a fluid entry opening and at least one fluid dispersing hole, and a deflector plate to at least partially form a fluid spray pattern onto at least a portion of said filter arrangement as said fluid flows out of said at least one fluid dispersing hole, said fluid discharge pipe including a purging arrangement, said purging arrangement including at least one purge opening to discharge a portion of said coolant from said fluid discharge pipe, said at least one purge opening having a cross-sectional area that is greater than a cross-sectional area of each of said fluid dispersing holes, said deflector plate connected to said fluid discharge pipe, said deflector plate connected to said fluid discharge pipe, said at least one fluid dispersing hole located on a lateral face of said fluid discharge pipe, said purge opening having a cross-sectional area that is greater than a cross-sectional area of each of said fluid dispersing holes, said purge opening having a cross-sectional area that is less than a cross-sectional area of said fluid entry opening.

38. The method as defined in claim 37, wherein said filter arrangement includes a filtration drum, said filtration drum at least partially preventing chips in said fluid from entering an interior chamber of said filtration drum as said fluid flows into said filtration drum.

39. The method as defined in claim 38, wherein an outer surface of said filtration drum at least partially includes a filtration medium.

40. The method as defined in claim 38, wherein said fluid dispersing arrangement directs fluid on an exterior surface of said filtration drum to at least partially remove chips on said exterior surface of said filtration drum.

41. The method as defined in claim 38, wherein said fluid dispersing arrangement directs fluid on an interior region of said filtration drum to at least partially remove chips on an exterior region of said filtration drum.

42. The method as defined in claim 37, wherein said filter arrangement includes a feed channel and a separating container, said feed channel directing fluid from said coolant treatment tank into said separating container, said separating container including a filtration medium that at least partially prevents chips in said fluid from exiting an interior region of said separating container.

43. The method as defined in claim 37, including the step of changing an angle of said deflector plate in relation to a location of said fluid dispersing hole and a direction of fluid sprayed out from said fluid dispersing hole so as to adjust the deflection and dispersion of flow sprayed out from said fluid dispersing hole can be adjusted.

44. The method as defined in claim 37, including the step of changing a location of said deflector plate in relation to a location of said fluid dispersing hole and a direction of fluid sprayed out from said fluid dispersing hole so as to adjust the deflection and dispersion of flow sprayed out from said fluid dispersing hole can be adjusted.

45. The method as defined in claim 37, including the step of changing a length of said deflector plate in relation to a location of said fluid dispersing hole and a direction of fluid sprayed out from said fluid dispersing hole so as to adjust the deflection and dispersion of flow sprayed out from said fluid dispersing hole can be adjusted.

46. A chip discharge system to separate metal chips contained in coolant discharged from a machine tool comprising a fluid dispersing arrangement that at least partially removes said chips retained in said system, said fluid dispersing arrangement having a fluid discharge pipe with at least one fluid dispersing hole, and a deflector plate to at least partially deflect and disperse fluid flowing out from the fluid dispersing hole, said fluid discharge pipe including a purging arrangement, said purging arrangement including at least one purge opening to discharge a portion of said coolant from said fluid discharge pipe, said at least one purge opening having a cross-sectional area that is greater than a cross-sectional area of each of said fluid dispersing holes, at least one end of said at least one purge opening including a cone-shaped nozzle.

47. A chip discharge system that includes a fluid dispersing arrangement that separates metal chips contained in coolant, said fluid dispersing arrangement comprising a fluid dispersing arrangement that at least partially removes said chips retained in said system having a fluid discharge pipe that includes an opening to receive a flow of fluid into said fluid discharge pipe, at least one fluid dispersing hole to enable fluid flow out of said fluid discharge pipe, and a deflector plate to at least partially deflect and disperse fluid flowing out from said at least one fluid dispersing hole, said fluid discharge pipe including a purging arrangement, said purging arrangement including at least one purge opening to discharge a portion of said coolant from said fluid discharge pipe, said at least one purge opening having a cross-sectional area that is greater than a cross-sectional area of each of said fluid dispersing holes, said deflector plate connected to said fluid discharge pipe, said at least one of said purge openings including an end having a cone-shaped nozzle.

* * * * *